United States Patent

Ishihara

[19]

[11] Patent Number: 6,098,016
[45] Date of Patent: Aug. 1, 2000

[54] DYNAMIC ROUTE GUIDANCE APPARATUS

[75] Inventor: Fuminari Ishihara, Susono, Japan

[73] Assignee: Toyota Jidosha Kabushiki Kaisha, Toyota, Japan

[21] Appl. No.: 08/982,265

[22] Filed: Dec. 1, 1997

[30]  Foreign Application Priority Data

Nov. 29, 1996 [JP] Japan ................................ 8-319425
May 27, 1997 [JP] Japan ................................ 9-137029

[51] Int. Cl.[7] ............................ G01C 21/00; G01S 21/00; G06G 7/78
[52] U.S. Cl. ............................ 701/209; 701/23; 701/200; 701/210; 340/988
[58] Field of Search .................................... 701/208, 209, 701/210, 211, 212, 200–201, 23, 206; 340/988, 990, 995

[56]  References Cited

U.S. PATENT DOCUMENTS

| 5,513,110 | 4/1996 | Fujita et al. | 701/207 |
| 5,613,055 | 3/1997 | Shimoura et al. | 340/995 |
| 5,818,356 | 10/1998 | Schuessler | 340/995 |

FOREIGN PATENT DOCUMENTS 7-190794  7/1995  Japan .
7-234995  9/1995  Japan .

OTHER PUBLICATIONS

Patent Abstracts of Japan, Vol. 1996, No. 1, Jan. 31, 1996 and JP 07 234995 A (Sumitomo Electric Ind., Ltd.), Sep. 5, 1996.

*Primary Examiner*—William A. Cuchlinski, Jr.
*Assistant Examiner*—Gertrude Arthur
*Attorney, Agent, or Firm*—Pillsbury Madison & Sutro LLP

[57]  ABSTRACT

A vehicle route guide system in which a vehicle transmits a destination to a control center, and the control center obtains an optimum route in consideration of current traffic conditions and notifies the vehicle of the route. In order to avoid a detour from a desirable route to the destination, the vehicle itself searches a route to the destination, and transmits destination data on a link to the control center. The link is located nearest to the destination among all UTMS links on the searched route, the UTMS links being controlled by the control center. Receiving the data, the control center calculates a recommended route which includes the notified link as a tailing link, and informs the vehicle of the route. The vehicle combines the searched route and the informed route into a final guiding route.

16 Claims, 8 Drawing Sheets

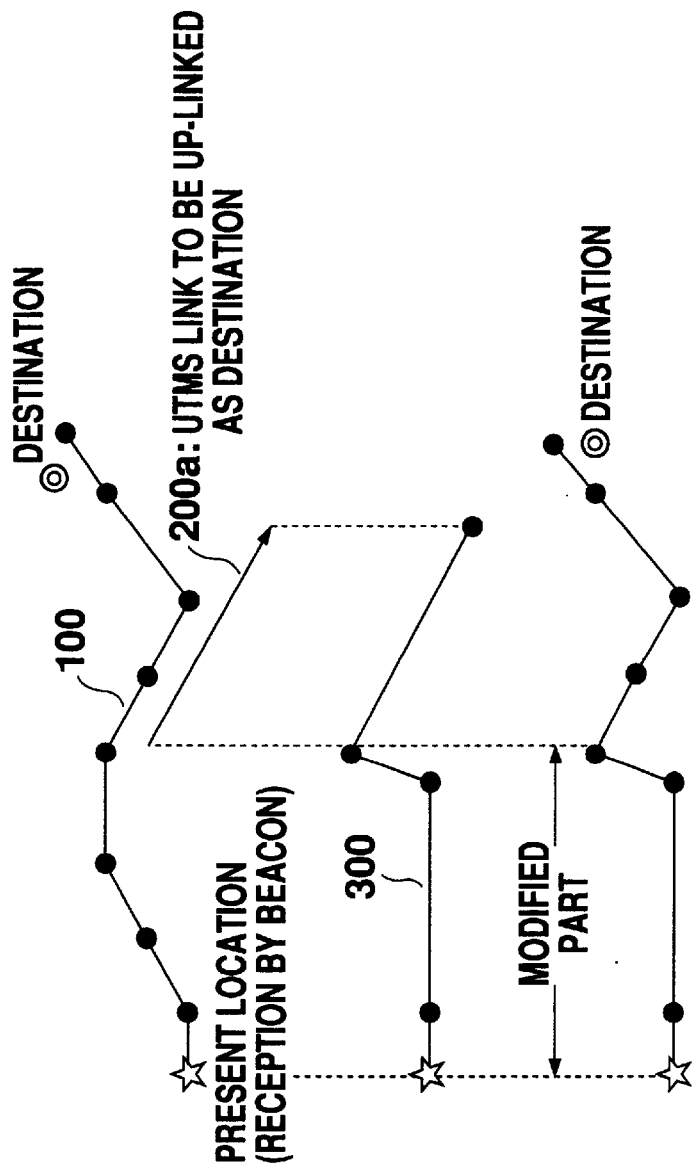

— NON-UTMS LINK
— UTMS LINK

PRESENT POSITION

DYNAMIC ROUTE GUIDANCE APPARATUS

BACKGROUND OF THE INVENTION

1. Field of the Invention

The present invention relates to a dynamic route guidance apparatus, and in particular, to a Centrally-Determined Route Guidance System (CDRGS) in which a vehicle transmits data regarding its destination to a control center, and the control center returns to the vehicle information regarding a recommended route to the destination.

2. Description of the Prior Art

Recently, a route guidance system has been suggested in which a vehicle transmits destination data to a road beacon, and a control center connected to the road beacon calculates a recommended route to the destination and notifies the vehicle of the route via the route beacon.

For instance, in a system disclosed in JP Laid-Open Publication No. Hei 7-190794, a vehicle equipped with a device for searching for a route to the destination, compares a recommended route transmitted by a control center and a route found by itself, and selects the most reliable and reasonable route of the two, based on the comparison result.

With this system, since a vehicle transmits unique destination information to a control center, the control center can calculate a route which goes only to a position according to the destination information, such as the nearest link to the destination. The route obtained by the control center sometimes turns out to be incorrect, thus causing the driver to take a longer or alternate route to arrive at the desired destination. The vehicle thus may often have to select a route found by itself, rather than a recommended route. That is, a recommended route based on a consideration of the current traffic conditions may not often be fully utilized in this system.

FIG. 10 schematically shows searching processes carried out by a control center which has received destination data from a vehicle. In the drawing, a thick line represents a link controlled by the control center (a connection line between nodes corresponding to major crossings and points where road beacons are installed; hereinafter referred to as a Universal Traffic Management Systems (UTMS) link); and a thin line represents a shorter link without UTMS link coverage (hereinafter referred to as a non-UTMS link). It is assumed that the nearest link to the destination is not a UTMS link but a non-UTMS link. In order to transmit an UTMS link which is nearest to the destination (the nearest UTMS link) as unique destination data, the vehicle selects and transmits data on Link BC to the control center. Based on this data, the control center calculates a recommended route, i.e., af-fb-bc, and notifies the vehicle of this route. The vehicle then combines the route notified and the route found by itself into a final route, i.e., af-fb-bc-cd-de-eg. However, this route is not the most direct route to the destination, therefore causing the driver to take a detour rather then a shorter, direct path to the desired destination.

SUMMARY OF THE INVENTION

The present invention overcomes the above problems and aims to provide a dynamic route guidance apparatus which can fully utilize a recommended route sent by a control center regardless of a destination.

According to one aspect of the present invention, a dynamic route guidance apparatus comprises memory for storing road data held by a control center and map data; a processor for searching for a route leading to a desired destination by utilizing the map data; and a transmitter for transmitting to the control center the road data on a road overlapping with the route searched, as guiding destination data; wherein the control center obtains a recommended route based on the guiding destination data, and informs a vehicle of the recommended route.

In the above dynamic route guidance apparatus, preferably, the road data is link data, and the transmitter transmits to the control center link data regarding a link which is located nearest to the desired destination among all links on the route searched, as the desired destination, among all of the link data.

Further preferably, the link data transmitted by the transmitter to the control center is link data on a link directing from a present position of the vehicle to the desired destination.

Still further preferably, the link data transmitted by the transmitter to the control center is link data on a link having at least one end overlapping with the route searched.

Still further preferably, the above dynamic route guidance apparatus further comprises a processor for replacing a part of the route searched with a corresponding part of the recommended route transmitted by the control center, the part covering from a present position of the vehicle to an overlapping point with the road for the road data held by the control center. Still further preferably, the road data is node data and link data, and the transmitter transmits to the control center node data regarding a nearest node as the guiding destination data when all links including the nearest node as a tailing end allow further proceeding therefrom toward the desired destination, the nearest node being located nearest to the desired destination among all nodes on the searched route.

Still further preferably, the road data is node data and link data, and the transmitter transmits to the control center link data on a link which directs opposite to a link which solely does not allow further proceeding therefrom toward the desired destination among all links including the nearest node as a tailing end, the nearest node being located nearest to the desired destination among all nodes on the searched route.

Still further preferably, the road data is node data and link data, and the transmitter transmits to the control center link data on any of links which allow further proceeding therefrom toward the desired destination on condition that a nearest link is located away from a nearest node by more than a predetermined value, when a plurality of links among all links including the nearest node as a tailing end do not allow further proceeding therefrom toward the desired destination, the nearest link being located nearest to the desired destination among all links on the searched route, the nearest node being located to the desired destination among all nodes on the searched route.

Still further preferably, the road data is node data and link data, and the transmitter transmits to the control center link data on a link which is a thoroughfare among all links which allow further proceeding therefrom toward the desired destination, as the guiding destination data, when a plurality of links among all links including the nearest node as a tailing end do not allow further proceeding therefrom toward the desired destination, the nearest node being located nearest to the desired destination among all nodes on the searched route.

Still further preferably, the road data is node data and link data, and the transmitter transmits to the control center link data regarding a link which goes in a direction substantially matching with a direction from a present position of a vehicle to the desired destination, among all links which allow further proceeding therefrom toward the desired destination, as the guiding destination data, when a plurality of links among all links including the nearest node as a tailing end do not allow further proceeding therefrom toward the desired destination, the nearest node being located nearest to the desired destination among all nodes on the searched route.

Still further, the road data is node data and link data, and the transmitter transmits to the control center link data regarding a link with a fastest traveling speed among all links which allow further proceeding therefrom toward the desired destination, as the guiding destination data, when a plurality of links among all links including the nearest node as a tailing end do not allow further proceeding therefrom toward the desired destination, the nearest node being located nearest to the desired destination among all nodes on the searched route.

According to another aspect of the present invention, a dynamic route guidance apparatus comprises a memory for storing road data held by a control center and map data; a processor for searching for a route leading to a desired destination by utilizing the map data; and a communicator for transmitting to the control center the road data on a road overlapping with the route searched, as guiding destination data; wherein the control center obtains a recommended route based on the guiding destination data, and informs a vehicle of the recommended route.

In the above dynamic route guidance apparatus, preferably the processor replaces a part of the route searched with a corresponding part of the recommended route transmitted by the control center, the part covering from a present position of a vehicle to an overlapping point with the road for the road data held by the control center.

As described above, according to the present invention, a vehicle does not simply transmit unique guiding destination data (a destination) to a control center, but transmits road data corresponding to respective routes searched for by the vehicle itself. This enables reduction of the likelihood that a recommended route informed to the vehicle by the control center includes detouring, so that the recommended route can be fully utilized.

BRIEF DESCRIPTION OF THE DRAWINGS

The above and other objects, features, and advantages, will become further apparent from the following description of the preferred embodiment taken in conjunction with the accompanying drawings wherein:

FIG. 4A is a diagram showing a searched route link line (a guidance route before modification);

FIG. 4B is a diagram showing a recommended route link line;

FIG. 4C is a diagram showing a guidance route line after modification;

DESCRIPTION OF THE PREFERRED EMBODIMENTS

In the following, preferred embodiments of the present invention will be described based on the accompanying drawings.

Embodiment 1

Figure 1:
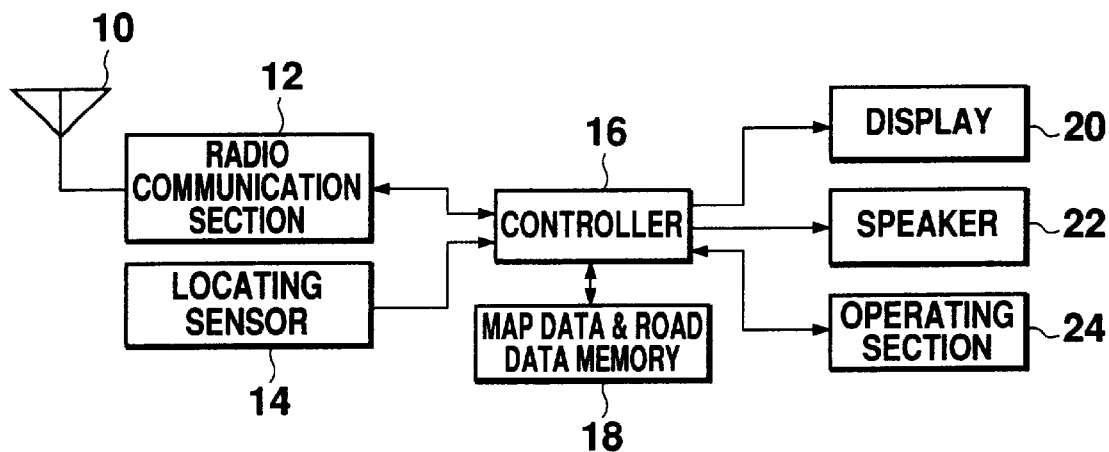
FIG. 1 is a block diagram showing the structure of a preferred embodiment of the present invention.

FIG. 1 is a block diagram showing the structure of a first preferred embodiment of the present invention. An antenna 10 and a radio communication section 12 are used for to-way data communication between a road beacon and a vehicle. The radio communication section 12 is connected to a controller 16 which includes a microcomputer (not shown) and a memory (not shown). The controller 16 transmits destination data and vehicle data (such as a speed) which has been inputted via an operation section 24 to the radio communication section 12, and further to a road beacon, (not shown) i.e., a control center. The controller 16 also displays recommended route data which has been transmitted via a road beacon on a display 20, or outputs as audio via a speaker 22. When an operation section 24 is provided in the form of a touch switch formed on a liquid crystal display, a display 20 can also act as an operation section 24. A locating sensor 14, which comprises a global positioning system (GPS) sensor, a wheel speed sensor, or a gyro sensor, locates the present position of a vehicle, and supplies data thereon to the controller 16. A map data memory 18, which comprises a CD-ROM and the like, is loaded with road map data and other information necessary for road searching (such as a road category and a distance). Based on this data, the controller 16 can display the present position of the vehicle and the map data overlapping with each other on the display 20, and can also search a route to a destination, independently of a control center. In addition to map data, the map data memory 18 is also loaded with UTMS link data and UTMS node data, which are road link data controlled by a control center, and positional relationships between map data links and UTMS links. Respective map data links and UTMS links are given identification numbers, and the positional relationship between a map link and an UTMS link both representing the same area, is expressed with an overlap flag "1." An example of a correspondence table is shown below.

TABLE 1

| Searched route link number | Overlap flag | Corresponding UTMS link number |
|---|---|---|
| 123455 | 0 | — |
| 123456 | 1 | 567889 |
| 123457 | 1 | 567890 |
| 123458 | 0 | — |
| . | . | . |
| . | . | . |
| . | . | . |

It should be noted that both ends of a map data link and those of its corresponding UTMS link are not necessarily matched with each other. In other words, when an UTMS link partly overlaps with a map data link, that UTMS link is considered to be a corresponding UTMS link to the map data link, and an overlap flag "1" is set to represent their relationship.

With the above structure, a user seeking an optimum route to a destination inputs data regarding a destination via the operation section 24. A destination may be defined using any desired method, such as by inputting its name or coordinate points. The inputted destination data is sent to the controller 16, which then searches for a route (a searched route) from the present position to the destination, referring to the map data stored in the map data memory 18, using a Dijkstra method, Nicholson method, or the like. After a searched route has been determined, the controller 16 selects a UTMS link which is located on the searched route and is nearest to the destination, and supplies data thereon via the radio communication section 12 to the control center (up-link).

Figure 2:
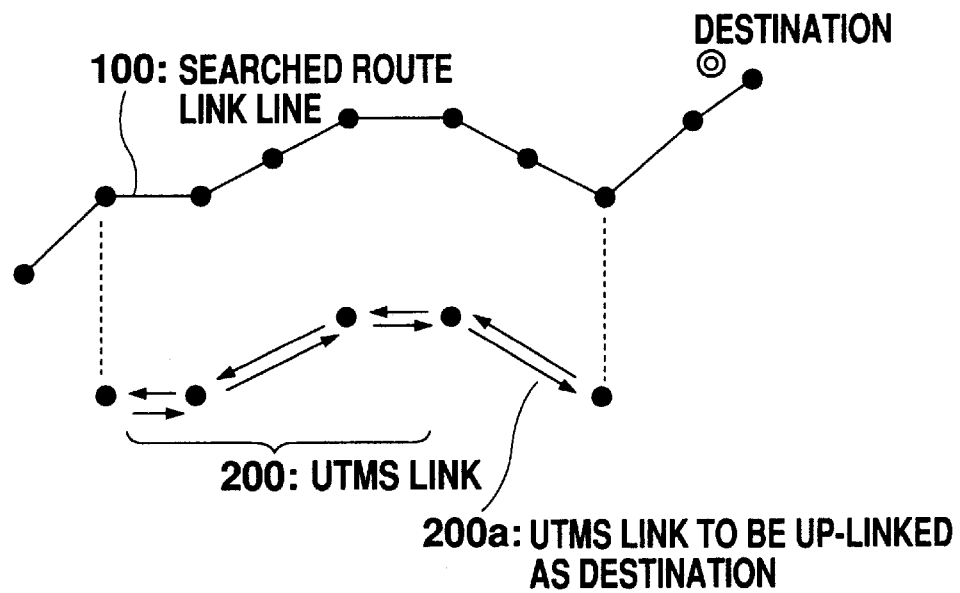
FIG. 2 is a diagram illustrating the relationship between a searched route link line and an UTMS link line.

FIG. 2 shows a searched route and a UTMS link to be up-linked. The route 100 is obtained by the controller 16 through a search based on the map data stored in the map data memory 18, which are more detailed data than the UTMS link data. The route 200 is an UTMS link line corresponding to the route 100. Of UTMS links consisting of the UTMS link line 200, a UTMS link which is nearest to the destination (the nearest UTMS link) is denoted as a UTMS link 200a. This link 200a is provided to the control center as destination data (guiding destination data).

It should be noted that there may be a case where more than one UTMS link corresponds to a single map data link because both ends of a map data link and those of its corresponding UTMS link are not always matched with each other, as mentioned above. In such a case, a UTMS link which is located nearest to the destination when viewed from the present position of a vehicle, or the nearest UTMS link, is selected as destination data from among all corresponding UTMS links, and this is provided to the control center.

It should also be noted that of two corresponding UTMS links to a single map data link, each going in an opposite direction, i.e., one toward the destination and the other away from the destination, a corresponding UTMS link that runs in the direction so as to get closer to the destination (the approaching direction) should be up-linked.

Figure 3:
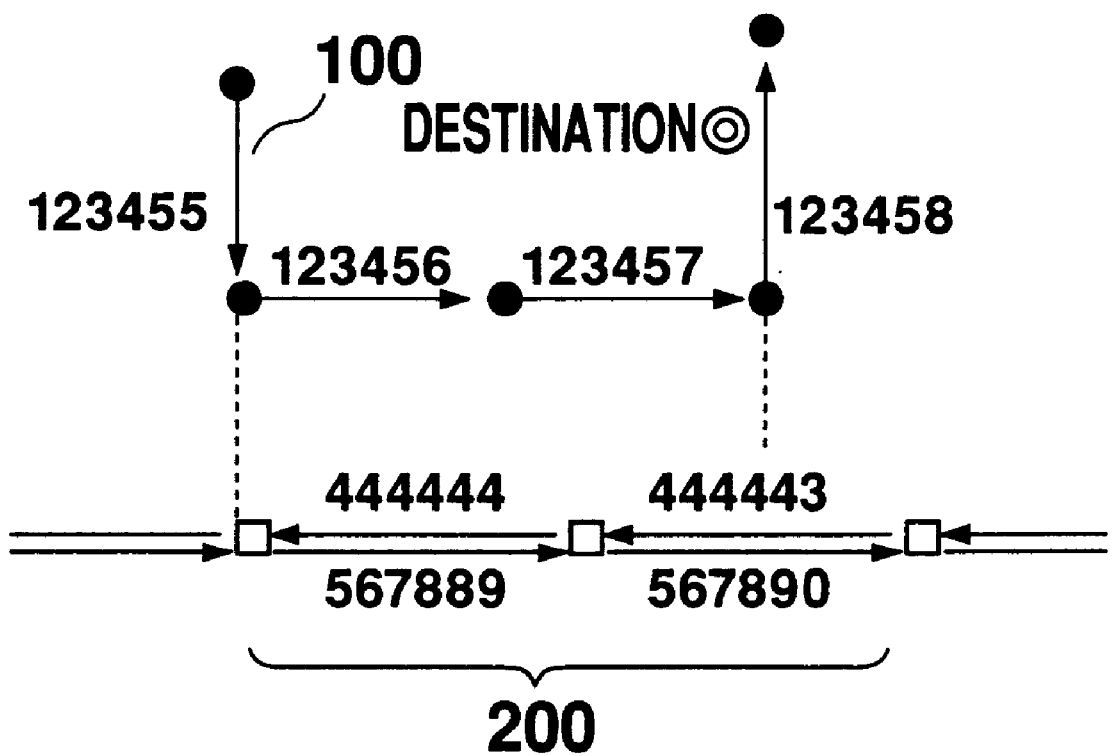
FIG. 3 is another diagram showing the relationship between a searched route link line and an UTMS link line.

FIG. 3 shows the state of processing when map data link has more than one corresponding UTMS link. It is assumed that the searched route link line 100 consists of map data links 123455-123456-123457-123458, and that the UTMS link line 200 consists of UTMS links 567889 (444444)-567890 (444443), wherein the parenthesized numbers denote links in the direction moving away from the destination. The UTMS link line 200 overlaps with a part of the searched route link line 100.

Here, map data link 123457 corresponds to UTMS links 567889 and 567890, as shown in the drawing. Of these two UTMS links, the nearest link to the destination, or UTMS link 567890, should be selected as destination data and up-linked. Alternatively, it is also preferable that an overlap flag "1" is set only to the nearest UTMS link when two or more UTMS links correspond to a single map data link, so that the UTMS link with an overlap flag "1" is up-linked.

After transmission of the thus selected destination data (guiding destination data), the control center calculates a recommended route with the minimum cost which goes from the present position of the vehicle to the up-linked UTMS link, and notifies the vehicle of the route. Cost calculation is made based on link costs (i.e., a traveling time), connection costs (e.g., infinity for no entry), and traffic condition information which the control center constantly receives (i.e., traffic jams or accidents). For instance, the cost of a link with a traffic jam is counted higher than that of other links, depending on the seriousness of the traffic jam, and the cost of a link which is closed due to construction is counted as infinite until completion of the construction. Information on a recommended route sent by the control center is supplied, via the antenna 10 and the radio communication center, to the controller 16 of the vehicle. The controller 16 combines the searched route and the recommended route into a final route, which is then displayed on the display 20.

FIGS. 4A, 4B, and 4C show the progress in which the controller 16 combined the above two routes. FIG. 4A shows a route obtained by a vehicle through a search using map data alone; FIG. 4B shows a recommended route with the minimum cost, obtained by the control center, the route ending with the up-linked UTMS link 200a; and FIG. 4C shows a final guidance route obtained by combining the above two routes such that the part of the searched route from the present position to the start of the UTMS link 200a is replaced by the corresponding part of the recommended route. The replaced part is denoted as "a modified part" in the drawing.

With such replacement, detouring is always avoided while a route with the minimum costs determined by the control center is fully utilized. As a result, the vehicle can reliably reach the destination in a short time because the finally determined route consists of a modified part comprising an optimum route for the current traffic condition, and an un-modified part comprising the shortest route avoiding any detour.

Figure 5B:
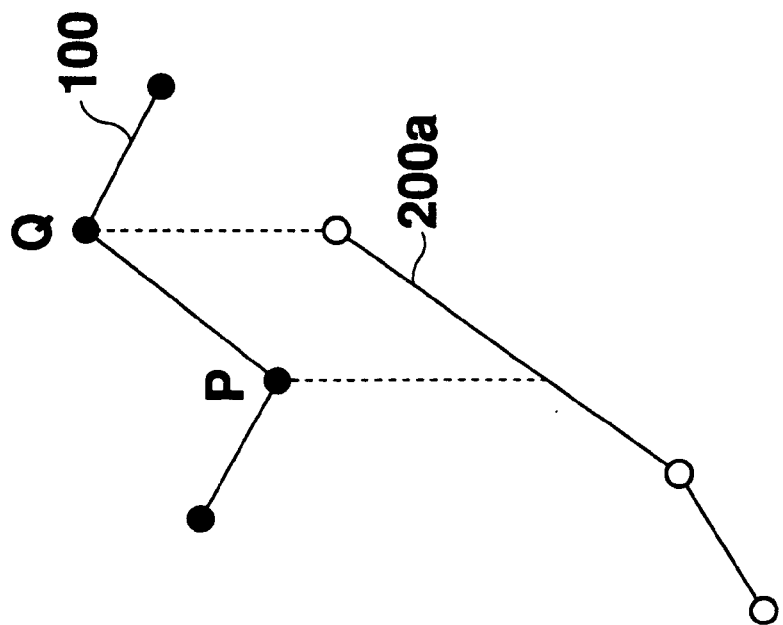
FIG. 5B is another diagram showing a searched route and a corresponding UTMS link overlapping with each other at one end of the UTMS link one end.
Figure 5A:
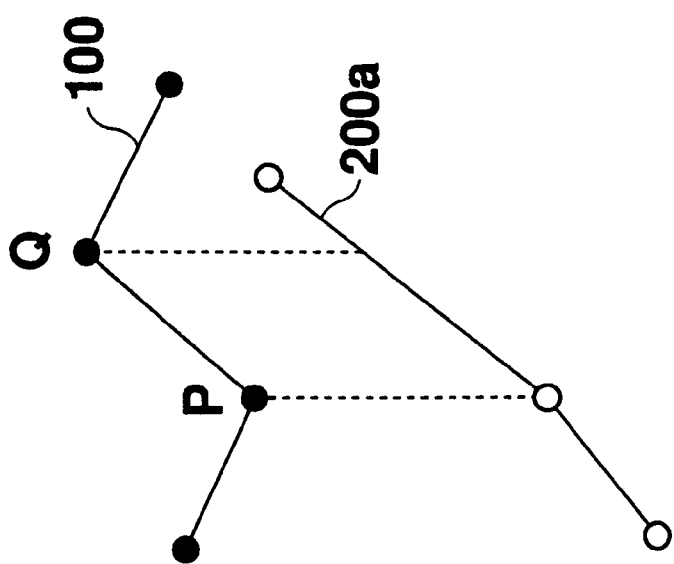
FIG. 5A is a diagram showing a searched route and a corresponding UTMS link overlapping with each other at one end of the UTMS link.

It should be noted that the UTMS link 200a, which is located on the searched route 100 and nearest to the destination, preferably overlaps with the searched route 100 at least at one end. FIGS. 5A and 5B show typical examples where one end of the UTMS link 200a overlaps with a searched route. In FIG. 5A, the UTMS link 200a overlaps with a searched route at the node P, while in FIG. 5B it overlaps at the node Q. This is preferable because a searched route and a recommended route must be finally combined into one final route, and combining them would require a complicated calculation without such a point of overlap. In the cases of FIGS. 5A and 5B, the two routes can be combined at the points P and Q, respectively. If there is no such point, on the other hand, a new point must be calculated at which to combine the two routes. Even though an overlapping point between an UTMS link 200a and a searched route 100 would be preferable, the presence of an overlapping point is not absolutely necessary in this embodiment. That is, a case where a new point must be calculated for route combining may not be excluded from this embodiment, and may be acceptable depending on the situation.

Incidentally, if UTMS links are subjected to coverage limitation as they do not cover, for instance, express ways, a UTMS link which is located on a searched route and nearest to the entrance of an express way, may be selected as destination data and provided to the control center.

Figure 6:
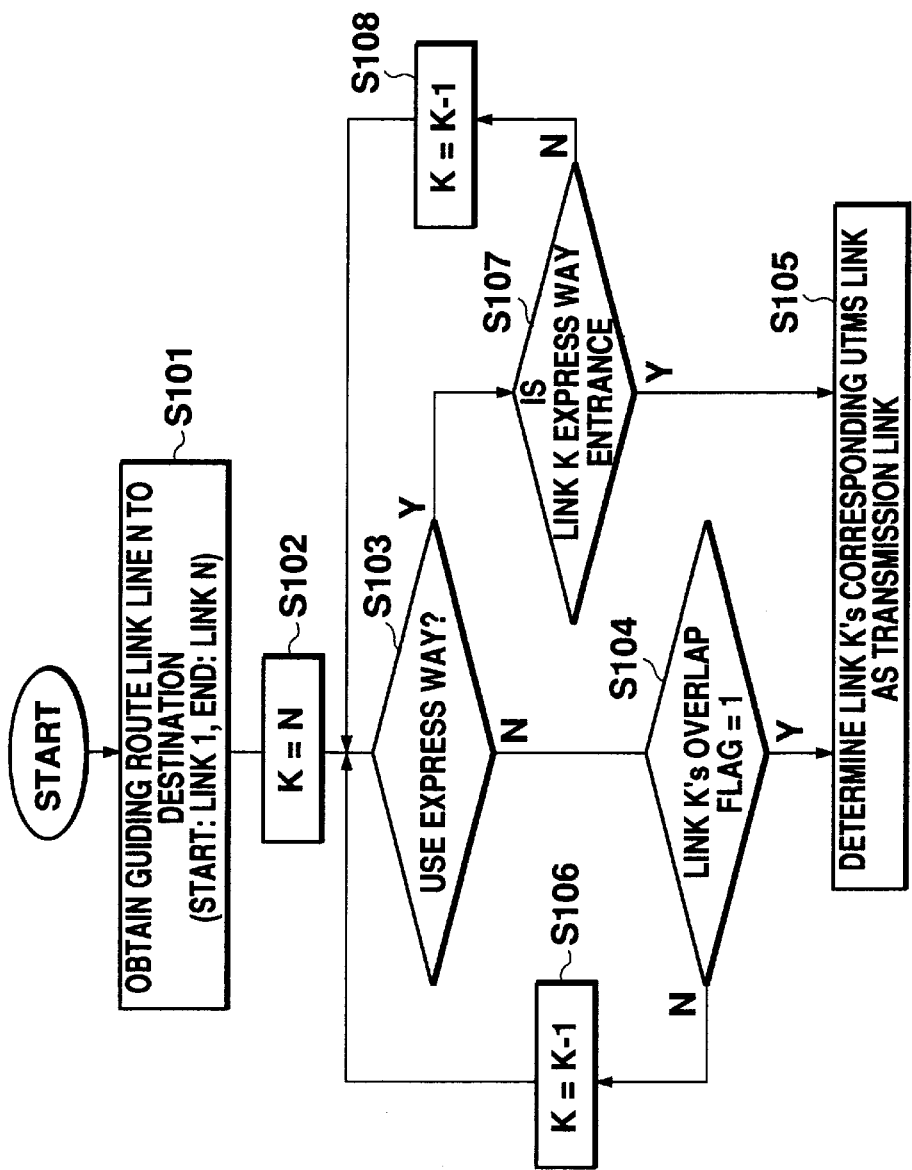
FIG. 6 is a flowchart for the first preferred embodiment using the option of driving on an express way.

FIG. 6 is an operation flowchart to be followed in such a case. Specifically, a guidance route link line N from the present position of the vehicle to the destination, (i.e., a searched route) is obtained (S101); a number k for specifying a link subject to the subsequent processing is set with the number of the tailing link of the link line N, or N, wherein a link specified by the number k is referred to as Link k (S102). Subsequently, it is judged whether or not the searched route includes an express way (S103). This judgement is made by determining whether or not the obtained guidance route link line N includes an area categorized as an express way. If the searched route does not include an express way, it is detected whether or not the overlap flag of Link k is "1" (S104). In other words, in this step it is detected whether or not Link k has a corresponding UTMS link. Note that this judgement is made beginning with a link on the destination side, since the number of the tailing link of the line N has been initially set to specify a subject link at S102. When the overlap flag "1" of Link k is found to be "1," a corresponding UTMS link to Link k is determined as a transmission link, or destination data to be up-linked to a road beacon and further to a control center (S105). With an overlap flag "0," on the other hand, the number k is decremented by 1 so that a link with the reduced number is then supplied to the processes at and after S103 (S106).

At S103, in the case where the searched route includes an express way, in other words, where the judgement result is positive, whether or not Link k leads to the entrance of the express way is judged (S107). If it does, Link k is set as a transmission link. If it does not, the number k is decremented by one so that a link which is located on the line N and the present position side by one link, is then rendered to the above process (S108).

Upon completion of all of the above processes, a final route is obtained which consists of a recommended route transmitted by the control center for the part from the present position of the vehicle to the entrance of an express way, and a searched route for the part from the entrance of the express way to the destination.

In the case where it is known that areas without UTMS coverage are not an express way, but other areas, whether or not a searched route includes such areas is detected at S103. Also, in the case where UTMS coverage includes express ways, processes at S103, S107, and S108 are obviously unnecessary.

Embodiment 2

In the first embodiment, the nearest UTMS link on the searched route 100 has been selected as guiding destination data, and provided to a control center. In some cases, however, a UTMS node which is located nearest to the destination (the nearest UTMS node) is more preferably provided as guiding destination data to a control center, depending on the situation between a searched route and UTMS links. In this embodiment, guidance destination data is determined in consideration of UTMS nodes as well.

Figure 7:
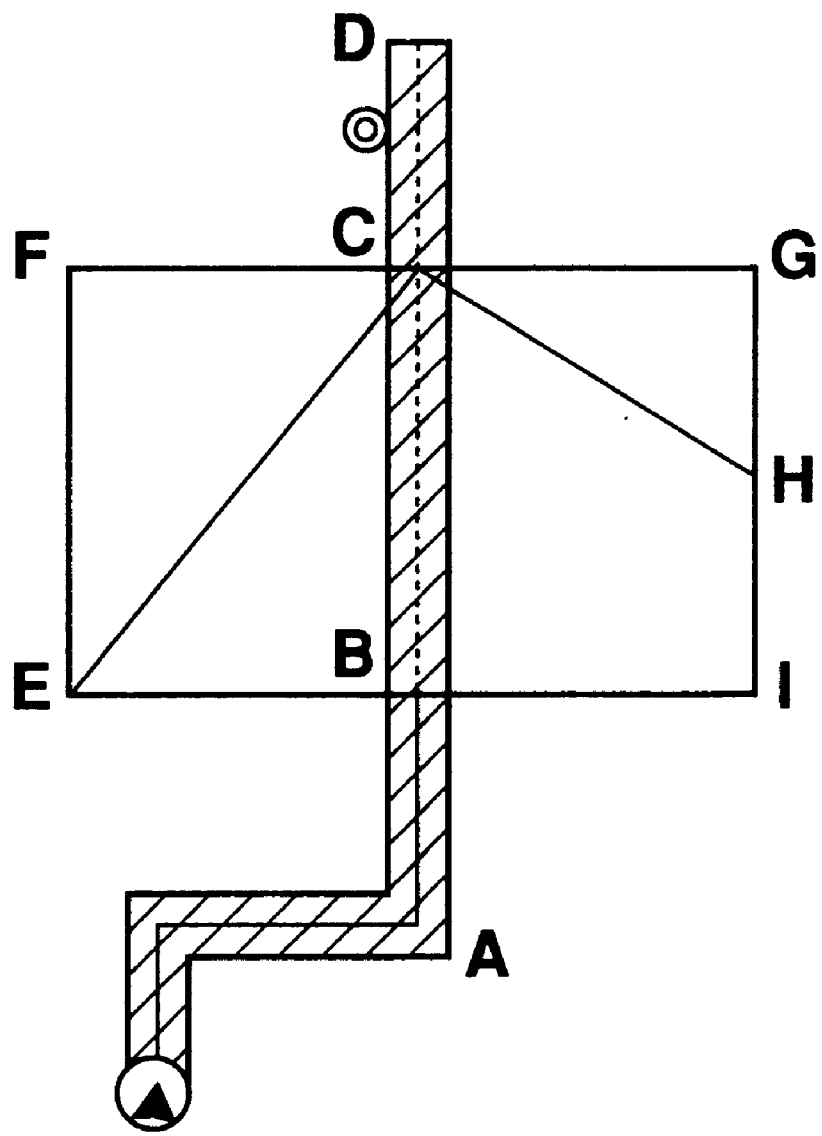
FIG. 7 is a diagram illustrating the relationship among a searched route, UTMS links, and non-UTMS links.

In FIG. 7, a solid line represents UTMS links; a broken line non-UTMS links; and an area with diagonal lines a searched route from the present position of a vehicle to a destination D. Specifically, Links AB, BE, EF, FC, EC, BI, IH, HC HG, and GC are UTMS links; nodes A, B, C, E, F, G, H, and I are UTMS nodes; and Link BC is a non-UTMS link. The searched route goes from the present position via UTMS nodes A, B, and C, to the destination D.

In the first embodiment, the nearest UTMS link (Link AB in FIG. 7) is selected as guidance destination data and informed to a control center. In actual fact, however, UTMS node C is nearer to the destination D than UTMS link AB in the drawing, and thus more preferably should be provided to the control center as guidance destination data to achieve better UTMS utilization.

Even in this case, however, a problem may be expected when the nearest UTMS node, or UTMS node C, is provided to the control center. That is, a recommended route is not specified, and any of the following routes may be selected as a recommended route:

(1) A-B-E-C
(2) A-B-E-F-C
(3) A-B-I-H-G-C
(4) A-B-I-H-C

Therefore, it is required in the above case that all Links EC, FC, GC, and HC allow further proceeding therefrom toward the destination. Otherwise, a problem may arise such that a vehicle is not able to follow a link informed by the control center. To be specific, if Link FC has left turn prohibited, the vehicle cannot follow the route (2) even if this route is recommended by the control center. Because of the possibility of such a problem, UTMS node C is concluded as being inappropriate to be up-linked as guidance destination data. The controller 16 according to this embodiment determines optimum guidance destination data in consideration of data no links around the nearest UTMS node, if it exists, and notifies the optimum guiding destination data to the control center.

Figure 8:
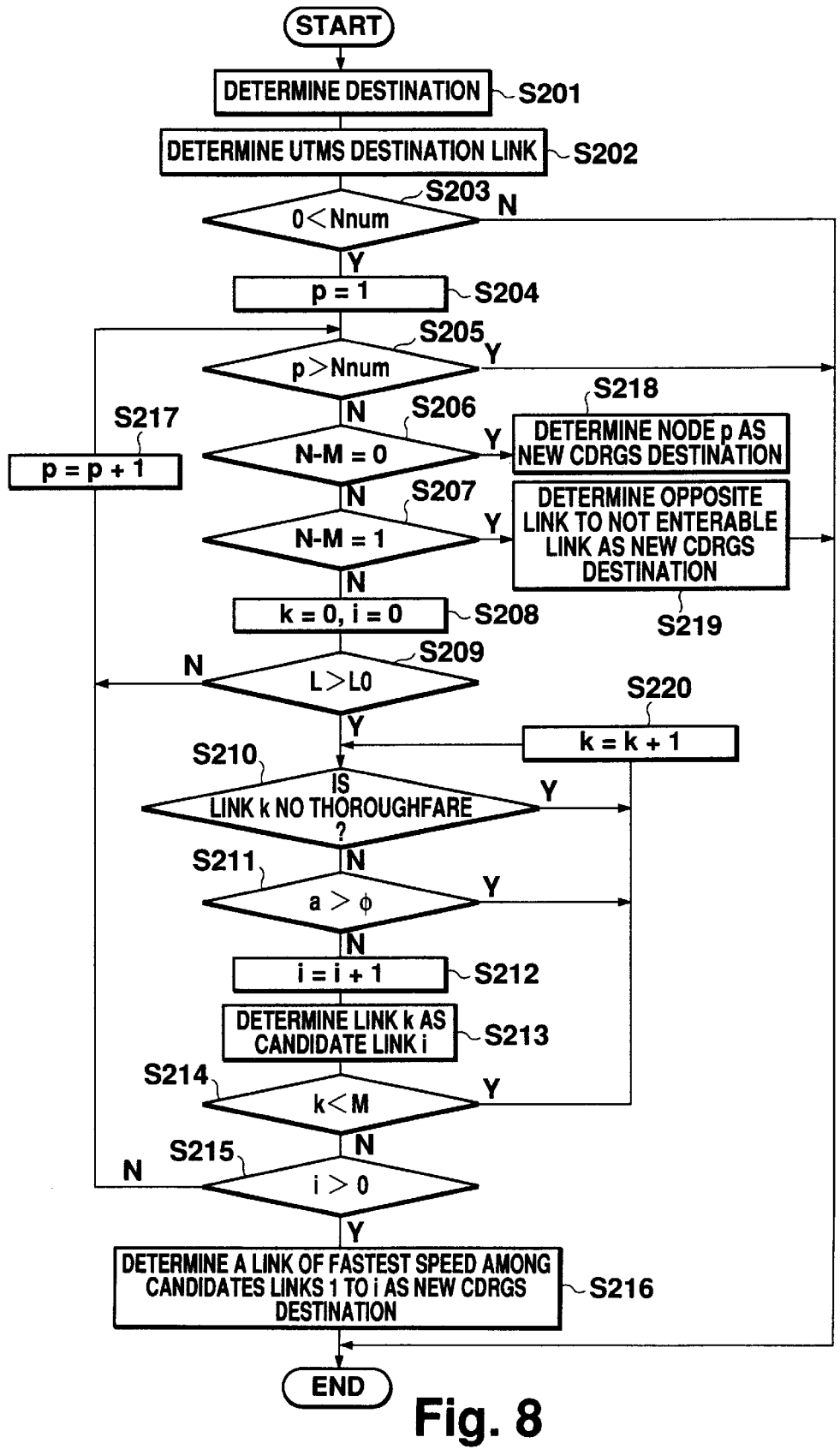
FIG. 8 is a flowchart for a second preferred embodiment of the present invention.

FIG. 8 is a flowchart showing the operation of the controller 16 according to this embodiment. Specifically, when a user sets a destination via the operation section 24 (S201), the nearest UTMS link to the destination is selected as guidance destination data (S202). In the drawing, guidance destination data is denoted as CDRG destination link as it is a CDRG destination. Subsequently, the number of UTMS nodes which are nearer to the destination than the CDRG destination link are counted, and whether or not the counted number, Nnum, is larger than 0 is determined (S203). In other words, whether or not there exists at least one UTMS node nearer to the destination than the CDRG destination link, is detected at this step. If no such UTMS node exists, the CDRG destination link is provided to the control center, as in to the first embodiment. However, if one or more such UTMS node exist(s), they are numbered such that the nearest UTMS node is referred to as Node 1, the second nearest UTMS node as Node 2, and so on for the rest. Then, a number p specifying a node to be processed next is set as 1 (S204), and compared with Nnum, to see whether or not the former is larger than the latter, wherein the node specified by the number p is referred to as Node p (S205). Initially, the comparison results in negative as p has been set to 1, or p=1. Then, judgement is made as to whether or not it is possible to proceed toward the destination from the tailing ends of all links whose tailing ends are Node p (S206). This judgement is made specifically by obtaining the difference between the number of UTMS links having Node p as a tailing end, or N, and the number of UTMS links having Node p as a tailing end and allows further proceeding from Node p toward the destination, or M, and checking whether or not N−M=0. If all such UTMS links allow further proceeding toward the destination, Node p, the nearest node, is selected as a new CDRG destination, and provided to the control center (S218).

To be specific, referring to FIG. 7, when Node p is Node C, and all links having Node C as a tailing end, namely Links EC, FC, HC, GC (thus N=4), allow further proceeding from Node C toward Link CD, Node C, the nearest node, is passed as a CDRG destination (guiding destination data) to a control center.

At S206, if all such links do not allow further proceeding therefrom toward the destination, Node p cannot be set as a CDRG destination. Therefore, the next determination to be made is the number of UTMS links which do not allow further proceeding from Node p toward the destination (S207). If there is only a single such UTMS link which does not allow further proceeding, a UTMS link which directs opposite to that UTMS link, that is, a UTMS link having Node p as a starting end, is set as a new CDRG destination (guiding destination data) and provided to the control center (S219).

To be specific, in FIG. 7, when Node p is Node C, and UTMS Link GC does not allow further proceeding from Node C toward the destination due to a right turn prohibited, Link CG, or a link directing opposite to Link GC, is set as a new CDRG destination (guiding destination). However, a recommended route to Node G is obtained when Link CG is up-linked intact. In order to obtain a recommended route to Node C, instead, relative positions within Link CG are preferably corrected to be 0. Alternatively, the part of a recommended route obtained with Link CG up-linked, from the present position of the vehicle to Node C, may be combined with the part of a searched route from Node C to the destination so as to obtain an optimum route.

At S207, if two or more UTMS links having Node p as a tailing end do not allow further proceeding from Node p toward the destination, the above method cannot be applied to the selection of a CDRG destination (guiding destination data), and a most preferable UTMS link must be selected from the UTMS links which allows further proceeding to the destination (a proceedable UTMS link). This selection is made according to, for instance, the following criteria:

(1) whether or not a separation extent between the tailing node of the nearest UTMS link on a searched route and the nearest UTMS node is large. In other words, whether or not a distance or the number of links intervening between these two nodes is large;

(2) whether or not a proceedable UTMS link is no thoroughfare;

(3) whether or not the direction of a proceedable UTMS link substantially matches with that from the present position of the vehicle to the destination (guiding destination); and (4) whether or not the traveling speed allowed for a proceedable UTMS link is large.

While sequentially applying these criteria, the controller 16 selects either proceedable UTMS link. Specifically, parameters k (for a subject link ) and i (for a candidate link) are initialized (S208); and a separation extent between the tailing node of the nearest UTMS link on the searched route and the nearest UTMS node is calculated, and compared with a predetermined value L0 (S209). With a separation extent equal to or smaller than the predetermined value L0, processes from S205 to S207 are performed with respect to a node having the next node number, i.e., p=p+1 (S209). With a separation extent larger than L0, on the other hand, whether or not Link k is not a thoroughfare is judged for the purpose of selecting the most appropriate link of all proceedable UTMS links including Node p, the nearest node, as a tailing node (S210). With Link k not being a thoroughfare, this UTMS link (Link k) cannot be used as a CDRG destination (guiding destination data). Then, the number k is incremented by one, i.e., K=K+1, so that a link, or a proceedable UTMS link, with the incremented number is then supplied to the above process (S220).

At S210, if Link k is a thoroughfare, whether or not the direction of Link k is the same as that from the present position of the vehicle to the destination (guidance destination), is judged (S211). This judgment is made specifically by detecting whether or not an angle α formed by these two directions is less than a predetermined value φ. If the angle α is equal to or larger than the predetermined value φ, in other words, if these two directions are apart from each other, the proceedable UTMS link involved is not appropriate for selection as guidance destination data, and the process at S220 is carried out again to specify the next proceedable UTMS link for the above processing. On the other hand, if the angle α is smaller than the predetermined value φ, in other words, if these two directions are substantially matched with each other, the parameter i for a candidate link is incremented by one whereby Link k is selected as a candidate link i (S213).

Figure 9:
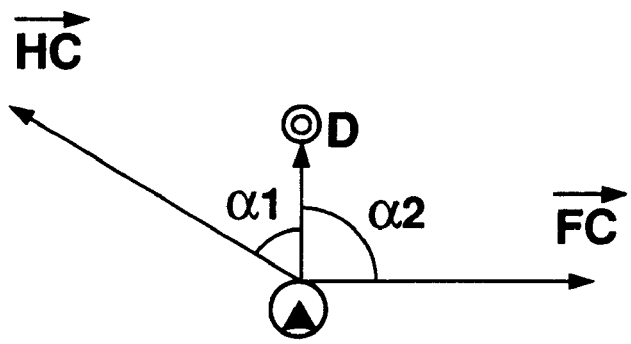
FIG. 9 is a diagram showing the directions of links.
Figure 10:
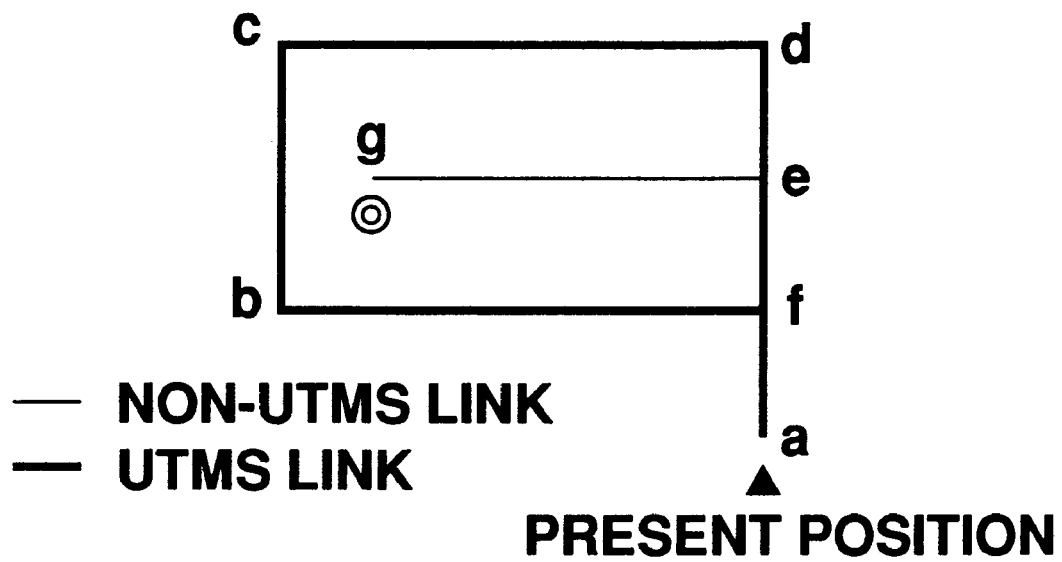
FIG. 10 is a diagram showing the relationship among a destination, UTMS links, and non-UTMS links.

FIG. 9 shows directions from the present position of a vehicle to the destination, and of proceedable UTMS links. It is assumed that Links HC and FC in FIG. 7 are thoroughfares. When α1<φ, α2>φ, Link HC alone is selected as a candidate link, wherein α1 is the angle formed by the vector from the present position to the destination and the vector of Link HC, and α2 is the angle formed by the same and the vector of Link FC.

After judgement for a candidate link i is carried out with respect to all proceedable UTMS links (S214), whether or not at least one candidate link i exists, is judged (S215). If no candidate link i exists (i=0), the number p specifying a subject node is incremented by one so that the next UTMS node is rendered to the above processes (S217). If a candidate node or nodes (a link or links i) exist(s), a link with the fastest traveling speed among all the candidate links is selected and set as a CDRG destination (guiding destination) (S216).

As a result of all the above processes, a more appropriate recommended route can be obtained because the controller 16 can select a route which allows further proceeding toward the destination, can be entered, runs closer to the direction from the present position of the vehicle to the destination, and allows the fastest traveling speed, and the control center can be notified of such a route.

In the above, when more than one UTMS link does not allow further proceeding therefrom toward the destination, the most appropriate proceedable UTMS link is selected from among all proceedable UTMS links, on the condition that the tailing node of the nearest UTMS link on a searched link (e.g., Node B of Link AB in FIG. 7) is located away from the nearest node (e.g., Node C in FIG. 7) by more than a predetermined value. However, any proceedable UTMS link including the nearest node as a tailing end may be selected, regardless of the above separation extent.

It should be noted that all the above criteria (1) to (4) are not necessarily met, and meeting some of them, such as (2) and (3), or (2) and (4), may be sufficient.

At S211, the angle α is compared with a predetermined value φ, and the two directions involved are concluded to be substantially matched with each other when the former is found smaller than the latter. Alternatively, an UTMS link which goes in a direction closest to the direction from the present position of the vehicle to the destination, among all proceedable UTMS links may be selected (regardless of a predetermined value). That is, the state of "being substantially matched with each other" includes not only a state in which a directional difference is less than a predetermined value, but also in which it is the smallest among all of them.

Also, when the separation extent between the nearest UTMS link on the searched route and the nearest node is smaller than a predetermined value, the nearest UTMS link (Link AB in FIG. 7), may be selected as a CDRG destination (guiding destination data) and provided to the control center, rather than selecting either the nearest node or an UTMS link having the nearest node as a tailing end, because recommended routes possibly obtained with a smaller separation extent than a predetermined value, will have only a small difference from one another.

As described above, according to the present invention, a vehicle does not simply transmit unique destination information to a control center, but transmits road data (a link or a node) which correspond to respective routes obtained by the vehicle itself. This enables elimination of the likelihood that a recommended route from the control center includes detouring, and resultantly allows more effective use of the recommended route.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A route guidance apparatus comprising:
    memory which stores road data and map data;
    a searching processor which searches for a route leading to a desired destination by utilizing the map data; and
    a transmitter which transmits data on a road overlapping with the route searched to a control center, as guiding destination data,
        wherein the control center obtains a recommended route based on the guiding destination data, and informs a vehicle of the recommended route.

2. The apparatus according to claim 1, wherein
    the road data is link data, and
    the transmitter transmits to the control center link data regarding a link which is located nearest to the desired destination among all links on the route searched, as the guiding destination.

3. The apparatus according to claim 2, wherein
    the link data transmitted by the transmitter to the control center is link data on a route from a present position of the vehicle to the desired destination.

4. The apparatus according to claim 2, wherein
    the link data by the transmitter to the control center is link data on a link having at least one end overlapping with the route searched.

5. The route guidance apparatus of claim 2, wherein if two lines overlap with the route searched, the transmitting means transmits to the control center link data regarding the link located nearest to the guiding destination.

6. The apparatus according to claim 1, further comprising:
    a processor which replaces a part of the route searched with a corresponding part of the recommended route transmitted by the control center, the recommended route replacement part covering from a present position of the vehicle to an overlapping point of the road data and the route searched.

7. The apparatus according to claim 1, wherein
    the road data is node data and link data, and
    the transmitter transmits to the control center node data regarding a nearest node as the guiding destination data when all links including the nearest node as a tailing end allow further proceeding therefrom toward the desired destination, the nearest node being located nearest to the desired destination among all nodes on the searched route.

8. The apparatus according to claim 1, wherein
    the road data is node data and link data, and
    the transmitter transmits to the control center link data on a link which directs opposite to a link which solely does not allow further proceeding therefrom toward the desired destination among all links including the nearest node as a tailing end, the nearest node being located nearest to the desired destination among all nodes on the searched route.

9. The apparatus according to claim 1, wherein
    the road data is node data and link data, and
    the transmitter transmits to the control center link data on any links which allow further proceeding therefrom toward the desired destination on condition that a link located nearest to the desired destination of all the links on the search route is farther away from a node located nearest to the desired destination of all the nodes on the searched route by more than a predetermined distance, when a plurality of links among all links including the nearest node do not allow further proceeding therefrom toward the desired destination.

10. The apparatus according to claim 1, wherein
    the road data is node data and link data, and
    the transmitter transmits to the control center link data on a link which is a thoroughfare among all links which allow further proceeding therefrom toward the desired destination, as the guiding destination data, when a plurality of links among all links including a nearest node located nearest to the desired destination among all the nodes of the search route do not allow further proceeding therefrom toward the desired destination.

11. The apparatus according to claim 1, wherein
    the road data is node data and link data, and
    the transmitter transmits to the control center link data regarding a link which goes in a direction substantially matching with a direction from a present position of a vehicle to the guiding destination, among all links which allow further proceeding therefrom toward the desired destination, as the guiding destination data, when a plurality of links among all links including the nearest node as a tailing end do not allow further proceeding therefrom toward the desired destination, the nearest node being located nearest to the desired destination among all nodes on the searched route.

12. The apparatus according to claim 1, wherein
    the road data is node data and link data, and
    the transmitter transmits to the control center link data regarding a link with a fastest traveling speed among all links which allow further proceeding therefrom toward the desired destination, as the guiding destination data, when a plurality of links among all links including a nearest node located nearest to the desired destination of all the nodes on the searched route do not allow further proceeding therefrom toward the desired destination.

13. The route guidance apparatus of claim 1, wherein a flag is used to indicate when a road overlaps the route searched.

14. A dynamic route guidance apparatus comprising:
    means for storing road data held by a control center and map data;
    means for searching for a route leading to a desired destination by utilizing the map data; and
    means for transmitting to the control center data on a road overlapping with the route searched, as guiding destination data,
        wherein the control center obtains a recommended route based on the guiding destination data, and informs a vehicle of the recommended route.

15. The apparatus according to claim 14, wherein
    the means for searching replaces a part of the route searched with a corresponding part of the recommended route transmitted by the control center, the part covering from a present position of a vehicle to an overlapping point with the road for the road data held by the control center.

16. The route guidance apparatus of claim 14, wherein the recommended route is determined based on travel time, connection or tollgate costs, or traffic condition information.

* * * * *